Sept. 7, 1965 E. B. PLOOIJ 3,204,539
APPARATUS FOR OPTICALLY PROJECTING
TYPES UPON A PICK-UP DEVICE
Filed Dec. 13, 1960 3 Sheets-Sheet 1

INVENTOR
EDWARD B. PLOOIJ,

BY

ATTORNEY

PRISM MOVING MEANS

INVENTOR
EDWARD B. PLOOIJ,
BY
ATTORNEY

United States Patent Office 3,204,539
Patented Sept. 7, 1965

3,204,539
APPARATUS FOR OPTICALLY PROJECTING
TYPES UPON A PICK-UP DEVICE
Edward B. Plooij, 92 Hobbemalaan,
Alkmaar, Netherlands
Filed Dec. 13, 1960, Ser. No. 75,501
Claims priority, application Netherlands, Dec. 14, 1959,
246,390
12 Claims. (Cl. 95—4.5)

This invention relates to an apparatus for optically projecting types upon a pick-up device, e.g. for projecting letters or other type characters for constituting words and other type combinations in composing for printing.

In most known apparatus of this kind it is necessary to displace type carriers or optical systems one by one for switching from one type character to the next to be projected. The parts to be moved in such known apparatus often have a considerable mass and in operating rapidly the accelerations and decelerations and thus the inertia forces are considerable. This gives rapid wear and after some wear the types are no longer projected exactly in the correct position. Moreover the picking-up (e.g. recording on a light sensitive film) is only possible after the moving parts have come to rest and accordingly the operating speed is limited.

The present invention aims at improving this and with this aim an apparatus as indicated in the preamble is according to the invention characterized in that a number of type carriers or picking-up units are positioned to the side of the optical axis of the optical system projecting upon the pick-up device and in that transverse to the plane through said type carriers or picking-up units and said optical axis a number of prisms or inclined mirrors movable into and out of said optical axis are positioned for, dependent upon the choice of a desired prism or mirror moved into said optical axis, projecting a certain type or projecting upon a certain picking-up unit.

Accordingly, the type carriers or picking-up units can be stationary and the mirrors or prisms can always remain accurately in their correct positions as regards the inclination of their reflecting surface. For they move perpendicular to the plane comprising the light rays and in the plane of their reflecting surface and accordingly it is unimportant how, during projecting, the mirrors or prisms are positioned in the direction of motion. It is not even objectionable when they are still moving during the projection. Accordingly, after having come to a stand-still, they can immediately start to move back again, and the shutter can open before the prism or mirror has stopped, whereas it can close after the backward motion has begun.

Accordingly it is possible to project very fast and at the same time very accurately.

Said apparatus is preferably designed so that a plurality of type carriers or picking-up units form a row which is inclined to the optical axis so that the length of the path of the light rays from the types via the prisms or mirrors to the optical system, or from the optical system via the prisms or mirrors to the picking-up units, is equal for all types or picking-up units.

One can save space by arranging an inclined row of type carriers or picking-up units at both sides of the optical axis. In this case it is preferred to use successive prisms or mirrors which are arranged two by two in each other's extension, the reflecting surfaces of each pair of prisms or mirrors being arranged at an angle to each other of which the optical axis is the bisector.

A very advantageous embodiment is obtained when according to another feature of the invention the apparatus is arranged so that each pair of prisms or mirrors is united via a portion having an aperture for unobstructed passage of light reflected by other mirrors or prisms along the optical axis, whereas each set of two prisms or mirrors is positioned in its inoperative position so that the aperture coincides with the optical axis. In such a case it is only necessary to move the prism or mirror over a short distance in either longitudinal direction to project selectively a type located at the one side or at the other side of the optical axis.

Each type carrier can carry more than one type character, said type character being arranged along the same line perpendicular to the plane comprising the optical axis. The picking-up device can then be arranged so that it can be moved parallel to the line along which the types of one type carrier are arranged, and the picking-up device can be equipped with a frame through which only the image of one type character can pass, so that by moving the picking-up device, only the desired type is projected.

The type carriers or a part arranged therebehind are e.g. translucent in diffuse manner whereas a source of light can be arranged therebehind.

As a matter of safety, light impervious baffles can be placed between the type carriers or picking-up units, the baffles extending towards the optical axis, substantially parallel to the path of the light rays of the adjacent type carriers to the corresponding prisms or mirrors, or from the mirrors or prisms to the corresponding picking-up units.

The invention will now be further described with reference to the accompanying drawings.

Figure 1:
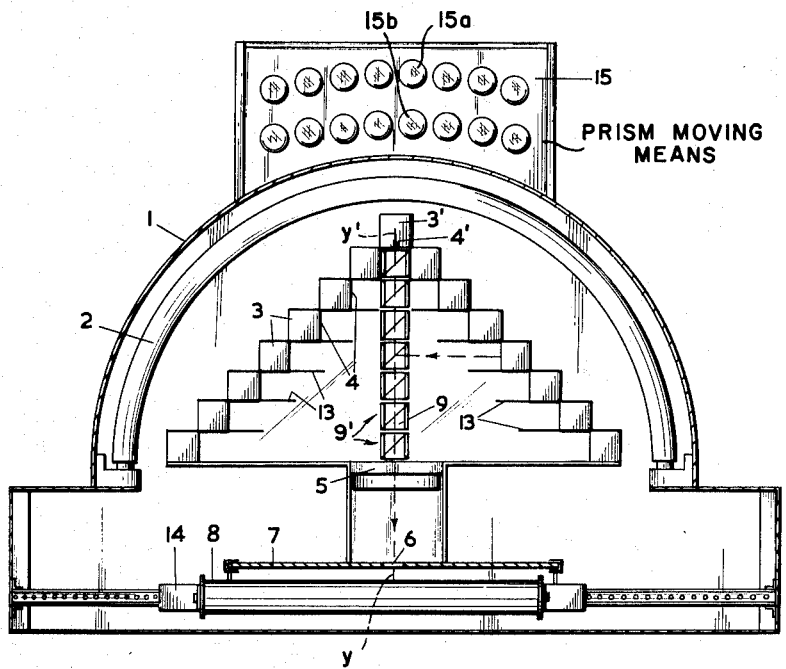
FIGURE 1 is a diagrammatic plan view, partly in section, of an apparatus according to the invention.
Figure 2:
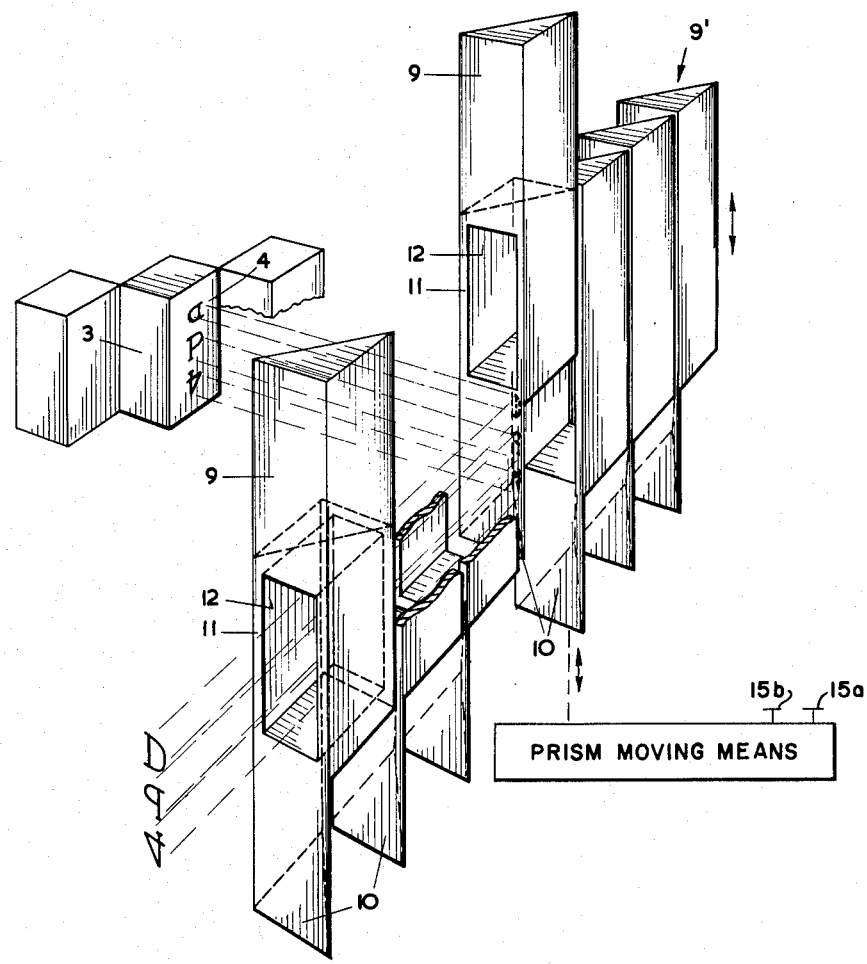
FIGURE 2 is a perspective view, partly broken away, of a plurality of prismatic bodies, one type carrier, and the path of the light rays for three type characters of said type carrier.

With more particular reference to the drawings, in the embodiment of FIGURES 1 and 2, a casing 1 has mounted in it an arcuate lamp 2 encircling the type carriers 3. Said type carriers 3 are formed by elongated blocks of diffusely translucent material, and each block carries, on its lateral surface 4, a plurality of type characters. FIGURE 2 shows three type characters on a type carrier. The type carriers are arranged in two rows which enclose an angle of 90 degrees. The bisector of this angle coincides with the optical axis y–y' of the optical system, which is made up of a lens or lens system 5, a shutter, and a frame aperture 6 in a diaphragm 7. A light sensitive film 8 is arranged behind the diaphragm 7 and can be reciprocated normal to the plane of the drawing of FIGURE 1, separately or together with the diaphragm 7, similar to the raising and lowering of a typewriter carriage by a shift key. Moreover the light sensitive film 8 can be moved horizontally, i.e., transversely of the optical axis y–y' and in the plane of the drawing of FIGURE 1, e.g. by means of a carriage 14 comparable to the carriage of a typewriter. In this manner the frame aperture 6 may be aligned with the desired character and the other characters of the type carrier are blocked by diaphragm 7.

A plurality of prismatic bodies 9', as clearly shown in FIGURE 2, are arranged along optical axis y–y' beween the lens system 5 and the center type carrier 3' located at the point at which the two series of type carriers meet. This center type carrier 3' also has type characters on its surface 4'. The prismatic bodies are composed of three portions, namely an upper prism 9, a lower prism 10 and a connecting portion 11. The connecting portion 11 is of about the same height as the prisms 9 and 10 and is provided with a large rectangular aperture 12. The prisms 9 and 10 are arranged so that their inclined reflecting surfaces are generally oppositely directed at an angle of 90 degrees to each other.

It will be readily apparent from FIGURE 1 that the path of the light rays from each type carrier, via its prism and then along the optical axis, to the lens system has the same length for all type characters, so that the image is always projected at the same distance from the lens system and no focussing is necessary. The optical system may be adjustable so as to vary the height of the projected images upon film 8, whereby it is possible to prepare printing matter of arbitrary height with the use of only one set of type characters.

Normally all prisms are in their middle position, so that their connecting portions 11 have their apertures 12 aligned with the optical axis y–y' of the lens system 5, thus allowing the characters on the face 4' of the center type carrier 3' to be seen from the lens system 5. In this position the optical axis y–y' is not intercepted by any of the prisms and there is a continuous channel for the light through the aligned apertures 12 of the series of prismatic bodies. Under the above conditions, when the shutter of the lens system 5 is opened, the type characters of the type carrier 3' will be projected on the film through the lens system 5 and the frame opening 6.

A keyboard 15 is provided with a plurality of keys 15a, 15b, etc., which are so connected with the prismatic bodies that when a key is pressed down, the corresponding prismatic body is moved upward or downward, as seen in FIGURE 2, that is, normal to the plane of the drawing of FIGURE 1. The operating means are arranged so that each prismatic body can be moved upward and downward over a third of its total height. In FIGURE 2, key 15a has been depressed down, one of the prismatic bodies 9' has been moved upward over a third of its total height, so that its lower prism 10 has been moved to the position normally occupied by the rectangular aperture 12. Now the reflecting surface of the lower prism 10 is interposed along the optical axis and prevents the light rays from the type carrier 3' and the types 4' thereon from passing to the lens system 5, whereas the light rays from the type carrier 3 shown in FIGURE 2 and corresponding to the displaced prismatic body, will be reflected by this body along the optical axis and will reach the lens system 5. After the shutter has opened, the three types of said type carrier will be projected by the lens system, but the frame aperture 6 has such a limited height that only the image of one of said three types will be projected on the sensitive film 8. It is possible to select the desired type out of the three types projected in the present example, by commonly displacing the film 8, the diaphragm 7 and the frame aperture 6 in vertical direction, much as the carriage, ribbon carrying frame and paper of a typewriter are displaced vertically by depression of the typewriter shift key.

When one of the prismatic bodies is moved downward, the types of a type carrier of the series opposite to the series of the type carrier shown in FIGURE 2 will be projected by the lens system. Non-reflecting baffles 13 are arranged between the type carriers and normal to the optical axis so as to prevent undesired reflection of light rays which are emitted by the type carriers in the sidewise direction transversely of the optical axis y–y'.

Figure 3:
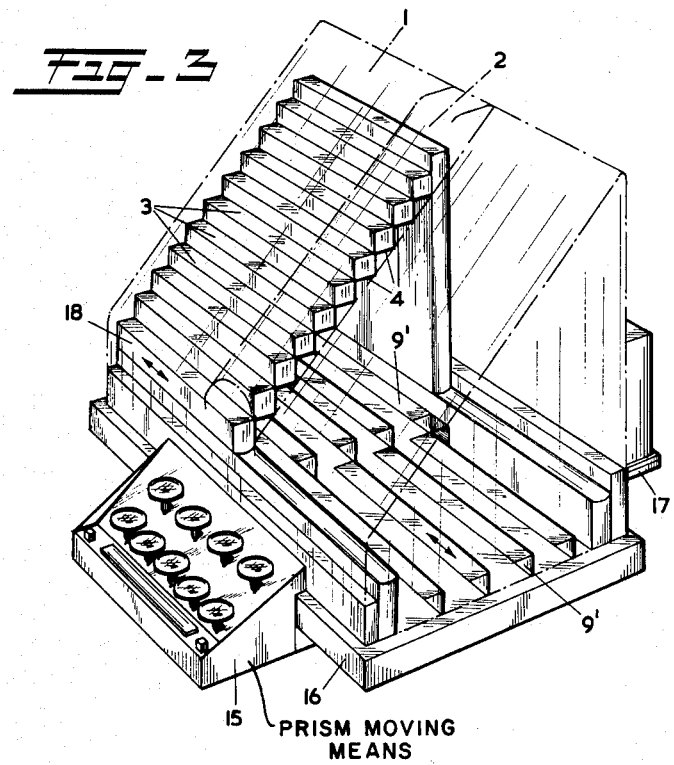
FIGURE 3 is a perspective view of a second embodiment of an apparatus according to the invention.
Figure 4:
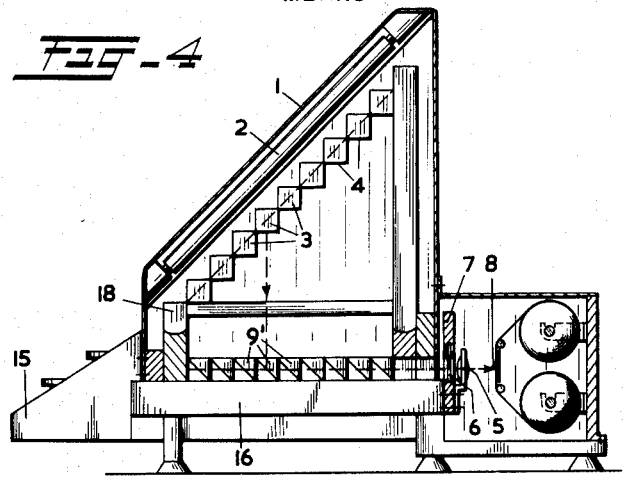
FIGURE 4 is a cross-section of the embodiment according to FIGURE 3.

In the embodiment according to FIGURES 3 and 4 the lamp 2 is rectilinear and is arranged in a recess of the casing 1 which is formed as a removable cap. The prismatic bodies 9' and the type carriers are carried by a support 16, which also carries the keyboard 15. A lateral extension 17 of the support 16 carries the recording system, that is the shutter, diaphragm, lens system and light sensitive film. In this embodiment there are several rows of type carriers 3, which are all arranged at one side of the series of prismatic bodies. Each row of type carriers carries at least one complete set of type characters, the sets of type characters in the different rows of type carriers being of different nature. The whole block 18 composed of the several rows of type carriers is laterally slidable, so that any desired row of type characters can be brought into alignment with the projecting system, that is, above the channel between the two rows of prismatic bodies. Thus, all the type carriers 3 move together as a single block 18. In this embodiment, each prismatic body only comprises one prism and these prisms are alternately arranged at both sides of the optical axis, so as to define a free central channel into which each prism can be extended by pressing one of the keys 15a, 15b, etc., of the keyboard. In principle the operation of this embodiment is the same as the operation of the embodiment of FIGURES 1 and 2. However, one can change from one kind of type character to another kind of type character by laterally sliding the whole block or set 18 of type carriers 3.

In all embodiments it is possible to provide only one type or two types on each type carrier. Moreover it is possible to have the light sensitive film move up and down without simultaneous up and down movement of the diaphragm having the frame aperture, so that each type can be projected at a desired height on the film. Moreover the film is vertically movable for recording the next line of type under the preceding one, after the latter has been completed.

It is also possible to use the above principle at the side where the light is emitted from the optical system so as to send the rays at choice to any one of a plurality of recording means (light sensitive films or plates). Then one can place a transparent plate of a certain color in part of each of the recording means, a different color for each different recording point, so that it is possible to compose multicolor printing matter. One of the recordings can then be made in black and white by leaving out the colored transparent plate. The recording means can be easily interchangeable, or there may be one recording means which can be moved from behind one of the colored plates to behind another one of the colored plates in a fast and easy manner. The above system may be combined with a system of type carriers as described, but it is also possible to use it separately.

Instead of manually operating the movable prisms by means of a keyboard, it is also possible to have their motion automatically controlled e.g. by means of a punched tape. It is also possible to provide a punched tape recorder for checking the matter recorded on the light sensitive film.

What I claim is:

1. Apparatus for optically projecting types, comprising, in combination:

(a) a set of elements having reflecting surfaces thereon, said elements being in alignment with an optical axis, each reflecting element being selectively movable solely in its own plane into an operative position in which it intersects said optical axis at an oblique angle, and movable into an inoperative position in which it is free of the optical axis to permit light transmission therealong; and (b) a set of elements having type carrying surfaces thereon, the number of type carrying elements being equal to the number of reflecting elements and each type carrying element being aligned with a different one of said reflecting surface elements and free of said optical axis for cooperation therewith so that when a reflecting surface element intersects the optical axis, type on the cooperating type carrying surface is reflected along the optical axis, said set of type carrying surface elements being arranged in stepwise fashion to the side of the optical axis and with respect to the set of reflecting surface elements such that the length of the light path from each of said type carrying surface elements via the cooperating reflecting surface element to a fixed point on the optical axis is equal for each type carrying surface element.

2. Apparatus as defined in claim 1, wherein the reflecting surfaces of said reflecting surface elements are disposed at an angle of 45 degrees with respect to the optical axis, and the type carrying surfaces are parallel to said optical axis.

3. Apparatus for optically projecting types, comprising, in combination:
  (a) a set of elements having reflecting surfaces thereon, said elements being in alignment with an optical axis, each reflecting element being selectively movable solely in its own plane into an operative position in which it intersects said optical axis at an oblique angle, and movable into an inoperative position in which it is free of the optical axis to permit light transmission therealong; and
  (b) a set of light recording means, each aligned with a different one of said reflecting surface elements and clear of said optical axis for cooperation therewith so that when a reflecting surface element intersects the optical axis, light rays transmitted along the optical axis are reflected onto the cooperating light recording means, said set of light recording means being arranged in stepwise fashion to the side of the optical axis and with respect to the set of reflecting surface elements such that the length of the light path from a fixed point on the optical axis via any of said reflecting surface elements to the corresponding light recording means is equal for all light recording means.

4. Apparatus as defined in claim 3, wherein the reflecting surfaces are disposed at an angle of 45 degrees with respect to the optical axis, and the light recording means have light recording surfaces which are parallel to said optical axis.

5. Apparatus for optically projecting types, comprising, in combination:
  (a) a first set of elements having reflecting surfaces thereon, said elements being in alignment with an optical axis, each reflecting element being selectively movable solely in its own plane into an operative position in which it intersects said optical axis at an oblique angle, and movable into an inoperative position in which it is free of the optical axis to permit light transmission therealong;
  (b) a set of elements having type carrying surfaces thereon, each aligned with a different one of said reflecting surface elements and free of said optical axis for cooperation therewith so that when a reflecting surface element intersects the optical axis, type on the cooperating type carrying surface is reflected along the optical axis, said set of type carrying surface elements being arranged in stepwise fashion to the side of the optical axis and with respect to the set of reflecting surface elements such that the length of the light path from each of said type carrying surface elements via the cooperating reflecting surface element to a fixed point on the optical axis is equal for each type carrying surface element;
  (c) a second set of elements having reflecting surfaces thereon, said elements being in alignment with said optical axis, each reflecting element being selectively movable solely in its own plane into an operative position in which it intersects said optical axis at an oblique angle, and movable into an inoperative position in which it is free of said optical axis to permit light transmission therealong; and
  (d) a set of light recording means, each aligned with a different one of said second reflecting surface elements and clear of said optical axis for cooperation therewith so that when a second reflecting surface element intersects the optical axis, light rays transmitted along the optical axis are reflected onto the cooperating light recording means, said set of light recording means being arranged in stepwise fashion to the side of the optical axis and with respect to the second set of reflecting surface elements such that the length of the light path from a fixed point on the optical axis via any of said second reflecting surface elements to the corresponding light recording means is equal for all light recording means, whereby by moving a selected one of said first reflecting surface elements and a selected one of said second reflecting surface elements, any of the type on said type carrying surface elements may be recorded on any of said light recording means.

6. Apparatus for optically projecting types, comprising in combination:
  (a) an optical system for receiving light rays passing along an optical axis;
  (b) a pick-up device arranged to receive light rays passing through said optical system;
  (c) a set of elements having reflecting surfaces thereon, said elements being in alignment with said optical axis, each reflecting element being selectively movable solely in its own plane into an operative position in which it intersects said optical axis at an oblique angle, and movable into an inoperative position in which it is free of said optical axis to permit light transmission therealong, said reflecting surface elements being arranged in a row, each reflecting surface element including two reflecting surfaces one above the other and at right angles to each other; and
  (d) a set of type carrying surface elements, one for each reflecting surface and two of each being aligned with a different one of said reflecting surface elements and clear of said optical axis for cooperation therewith so that when a reflecting surface intersects the optical axis a type on the cooperating type carrying surface is reflected along the optical axis, said set of type carrying surfaces being arranged in stepwise fashion to each side of the optical axis and with respect to said reflecting surfaces such that the length of the light path from each of said type carrying surface elements via the cooperating reflecting surface element to a fixed point on the optical axis is equal for each type carrying surface element.

7. Apparatus as defined in claim 6, wherein each reflecting surface element includes a portion connecting the two reflecting surfaces, said connecting portion having an aperture therein to permit passage therethrough of light rays traveling along said optical axis, each reflecting surface element being arranged so that when it is in the inoperative position the aperture in said connecting portion is aligned with said optical axis.

8. Apparatus for optically projecting types, comprising, in combination:
  (a) an optical system for receiving light rays passing along an optical axis;
  (b) a set of elements having reflecting surfaces thereon, said elements being in alignment with said optical axis, each reflecting element being selectively movable solely in its own plane into an operative position in which it intersects said optical axis at an oblique angle, and movable into an inoperative position in which it is free of said optical axis to permit light transmission therealong;
  (c) a set of type carrying surface elements, each having a plurality of type indicia thereon and being aligned with a different one of said reflecting surface elements and free of said optical axis for cooperation therewith so that when a reflecting surface element intersects the optical axis, a type indicium on the cooperating type carrying surface is reflected along the optical axis, said set of type carrying surface elements being arranged in stepwise fashion to the side of the optical axis and with respect to the set of reflecting surface elements such that the length of the light path from each of said type carrying surface elements via the cooperating reflecting surface element to a fixed point on the optical axis is equal for each type carrying surface element; and (d) a pick-up device arranged to receive light rays passing through said optical system, said device being vertically movable to select one of said type indicia to be received thereby.

9. Apparatus for optically projecting types, comprising, in combination:

(a) an optical system for receiving light rays passing along an optical axis;

(b) a pick-up device arranged to receive light rays passing through said optical system;

(c) a set of elements having reflecting surfaces thereon, said elements being in alignment with said optical axis, each reflecting element being selectively movable solely in its own plane into an operative position in which it intersects said optical axis at an oblique angle, and movable into an inoperative position in which it is free of said optical axis to permit light transmission therealong; and (d) a set of elements having type carrying surfaces thereon, each aligned with a different one of said reflecting surface elements and free of said optical axis for cooperation therewith so that when a reflecting surface element intersects the optical axis, type on the cooperating type carrying surface is reflected along the optical axis, said set of type carrying surface elements being arranged in stepwise fashion to the side of the optical axis and with respect to the set of reflecting surface elements such that the length of the light path from each of said type carrying surface elements via the cooperating reflecting surface element to a fixed point on the optical axis is equal for each type carrying surface element.

10. Apparatus as defined in claim 9, wherein said type carrying surfaces are arranged in several adjacent rows, each row having a complete set of type characters, and the whole set of rows being slidable in a direction at right angles to said optical axis.

11. Apparatus as defined in claim 9, comprising light-impervious baffles between said type carrying elements and extending at right angles to the optical axis and substantially parallel to the path of the light rays from adjacent type carrying elements to their corresponding reflecting surfaces.

12. Apparatus as defined in claim 9, wherein said reflecting elements include prisms which are isosceles right triangles in cross section, the hypotenuse of each prism defining one of said reflecting surfaces.

References Cited by the Examiner

UNITED STATES PATENTS 2,646,732    7/53    Offeman    95—4.5
2,946,268    7/60    Moyroud    95—4.5

FOREIGN PATENTS 1,057,446    10/53    France.

NORTON ANSHER, *Primary Examiner.*

JOHN M. HORAN, EMIL G. ANDERSON, *Examiners.*